(12) United States Patent
Timmermann

(10) Patent No.: US 9,509,088 B2
(45) Date of Patent: Nov. 29, 2016

(54) CONNECTION ELEMENT

(71) Applicant: SAINT-GOBAIN GLASS FRANCE, Courbevoie (FR)

(72) Inventor: Alwin Timmermann, Cologne (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/369,173

(22) PCT Filed: Jan. 16, 2013

(86) PCT No.: PCT/EP2013/050692
§ 371 (c)(1),
(2) Date: Jun. 26, 2014

(87) PCT Pub. No.: WO2013/107749
PCT Pub. Date: Jul. 25, 2013

(65) Prior Publication Data
US 2014/0349515 A1    Nov. 27, 2014

(30) Foreign Application Priority Data

Jan. 20, 2012  (EP) ..................... 12151889

(51) Int. Cl.
*H01R 13/60*    (2006.01)
*H01R 12/70*    (2011.01)
(Continued)

(52) U.S. Cl.
CPC ............. *H01R 13/60* (2013.01); *B32B 37/12* (2013.01); *B32B 37/16* (2013.01); *H01R 12/7041* (2013.01); *H01R 12/716* (2013.01);
(Continued)

(58) Field of Classification Search
CPC ................. H01R 13/60; B32B 37/12
USPC ..................................... 439/326, 527
See application file for complete search history.

(56) References Cited

U.S. PATENT DOCUMENTS 4,347,552 A    8/1982  Pearcy et al.
5,041,005 A    8/1991  McHugh et al.
(Continued)

FOREIGN PATENT DOCUMENTS

CN    1103996 A    6/1995
CN    1104382 A    6/1995
(Continued)

OTHER PUBLICATIONS

PCT International Search Report mailed on Mar. 21, 2013 for PCT/EP2013/050692 filed on Jan. 16, 2013 in the name of Saint-Gobain Glass France.
(Continued)

*Primary Examiner* — Amy Cohen Johnson
*Assistant Examiner* — Oscar C Jimenez
(74) *Attorney, Agent, or Firm* — Steinfl & Bruno LLP

(57) ABSTRACT

A connection assembly is described. The connection assembly has a substrate having at least two electrically conductive structures, a housing, which is connected to the substrate on the bottom by an adhesive fastening, the housing has a plug receptacle having at least two plug contacts, the plug contacts are connected to at least two contact pads via electrical conductors, and the contact pads connected in an electrically conducting fashion to the electrically conductive structures, the angle between the plug-in direction into the plug receptacle and the bottom of the housing lying between 15° to 90°.

15 Claims, 11 Drawing Sheets

Figure 1:
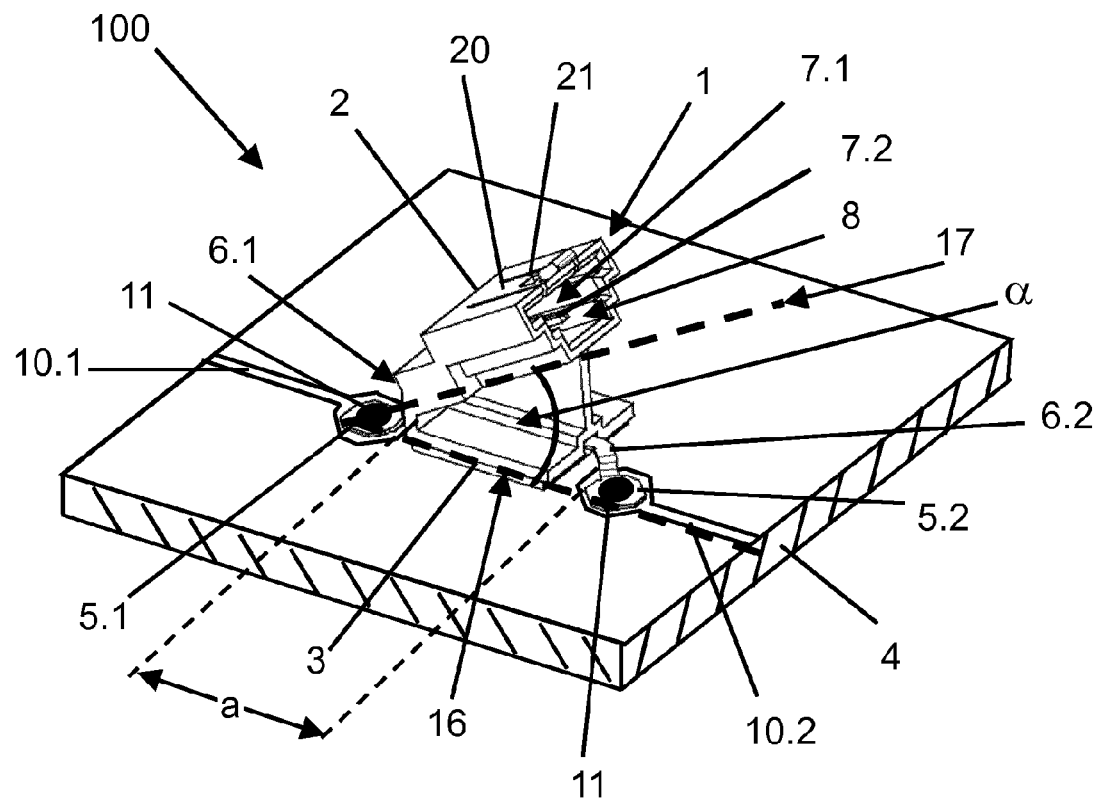

(51) Int. Cl.
*H01R 12/71* (2011.01)
*B32B 37/12* (2006.01)
*B32B 37/16* (2006.01)

(52) U.S. Cl.
CPC ...... *B32B2307/202* (2013.01); *B32B 2457/00* (2013.01); *Y10T 29/49018* (2015.01); *Y10T 29/49083* (2015.01); *Y10T 29/49208* (2015.01)

(56) References Cited

U.S. PATENT DOCUMENTS

| | | | |
|---|---|---|---|
| 5,337,220 A * | 8/1994 | Granitz | 361/816 |
| 5,366,390 A | 11/1994 | Kinross et al. | |
| 5,460,537 A * | 10/1995 | Noschese | 439/325 |
| 6,050,853 A | 4/2000 | Ando et al. | |
| 6,204,480 B1 * | 3/2001 | Woodard | B32B 17/10 219/203 |
| 7,247,047 B2 * | 7/2007 | Baranski et al. | 439/495 |
| 7,311,525 B2 * | 12/2007 | Koiwaya | H01R 35/02 439/131 |
| 8,299,400 B2 * | 10/2012 | Prone | B32B 17/10036 219/203 |
| 2004/0247921 A1 | 12/2004 | Dodsworth et al. | |
| 2006/0234523 A1 | 10/2006 | Baranski et al. | |
| 2007/0151661 A1 * | 7/2007 | Mao et al. | 156/250 |
| 2011/0109115 A1 | 5/2011 | Yamada et al. | |

FOREIGN PATENT DOCUMENTS

| | | |
|---|---|---|
| CN | 1922661 A | 2/2007 |
| CN | 102084551 A | 6/2011 |
| DE | 20215634 U1 | 2/2004 |
| DE | 202008015441 U1 | 4/2010 |
| DE | 102009026021 A1 | 12/2010 |
| EP | 0657970 A2 | 6/1995 |
| EP | 1488972 A1 | 12/2004 |
| EP | 2299544 A1 | 3/2011 |
| JP | H10270128 A | 10/1998 |
| JP | 2004189023 A | 7/2004 |
| JP | 2011044272 A | 3/2011 |
| WO | 2010057641 | 5/2010 |

OTHER PUBLICATIONS

PCT Written Opinion mailed on Mar. 21, 2013 for PCT/EP2013/050692 filed on Jan. 16, 2013 in the name of Saint-Gobain Glass France (English + German).

* cited by examiner a) Bonding of a housing (2) to a substrate (4) via an adhesive fastening (3)

b) Electrically conductive connection of the at least two contact pads (5.1, 5.2) to electrically conductive structures (10.1, 10.2) on the substrate (4)

c) Plugging the plug (12) into the plug receptacle (8)

CONNECTION ELEMENT

CROSS REFERENCE TO RELATED APPLICATIONS

The present application is the US national stage of International Patent Application PCT/EP2013/050692 filed on Jan. 16, 2013 which, in turn, claims priority to European Patent Application EP 12151889.8 filed on Jan. 20, 2012.

The invention relates to a connection arrangement for contacting electrically conductive structures on a substrate and in particular on a heating film or a motor vehicle window, a connection element, and an economical method for producing the connection arrangement.

Modern motor vehicle windows often have fine, electrically conductive structures, that are hardly perceptible visually, which serve, for example, as heating conductors, antenna conductors, or alarm loops. The electrically conductive structures are customarily contacted electrically via soldered-on metal brackets, as is known from EP1488972A1 and DE202008015441U1.

Alternatively, such electrically conductive structures are mounted on a thin carrier film and the carrier film is glued to the vehicle window, as is known from DE102009026021A1.

Due to the different coefficients of thermal expansion of the materials used, mechanical stresses that can strain the panes and result in breakage of the pane occur during production and operation. Since the electrically conductive structures are very thin, the contact point with the metal bracket has low stability and is susceptible to shearing forces. Moreover, adapter systems are necessary to convert the connections to the metal brackets into a plug format customary for onboard electronics.

In contrast, the object of the present invention consists in making available an improved connection arrangement and an improved connection element that enables simple and lasting electrical contacting of thin electrically conductive structures on a substrate. Another object consists in making available a simpler and more economical method for producing a connection arrangement according to the invention. These and other objects are accomplished according to the proposal of the invention through the characteristics of the coordinated claims. Advantageous embodiments of the invention are indicated through the characteristics of the subclaims.

The invention relates to a connection arrangement, comprising at least:
- a substrate having at least two electrically conductive structures,
- the housing that is bonded on its bottom to the substrate by an adhesive fastening,
- the housing has a plug receptacle having at least two plug contacts,
- the plug contacts are connected via electrical conductors to at least two contact pads, and
- the contact pads are electrically conductively connected to the electrically conductive structures, wherein the angle $\alpha$ between the plug-in direction of the plug receptacle and the bottom of the housing is from 15° to 90°.

Another aspect of the invention relates to a connection element, comprising at least:
- a housing that has an adhesive fastening on its bottom for bonding to a substrate,
- the housing has a plug receptacle having at least two plug contacts, and
- the plug contacts are connected via electrical conductors to at least two contact pads, wherein the contact pads are suitable for the electrical contacting of electrically conductive structures on the substrate and the angle $\alpha$ between the plug-in direction of the plug receptacle and the bottom of the housing is from 15° to 90°.

The angle $\alpha$ is advantageously from 30° to 70°, preferably from 35° to 55°, and in particular from 42° to 47°.

In an advantageous embodiment of the invention, the plug receptacle is arranged above the bottom of the housing and above the adhesive fastening, in particular perpendicular to the substrate above the adhesive fastening. This has the particular advantage that forces that occur at the time of insertion of the plug into the plug receptacle act, for the most part, perpendicular to the substrate. The substrate or its support are largely pressure resistant. Thus, an effect of force on the connection point between the contact pad and the electrically conductive structure as well as on the electrically conductive structure itself is substantially avoided.

In an alternative embodiment of the invention, the angle between the plug-in direction of the plug receptacle and the bottom of the housing is roughly 45°. This has the particular advantage that forces that occur at the time of insertion of the plug into the plug receptacle act with a large force component perpendicular to the substrate. Thus, an effect of force on the solder points or connection points of the contact pads and the electrically conductive structures and on the electrically conductive structures themselves is reduced and, in the case of an angle of 45°, is reduced by roughly half.

The housing and/or the plug preferably contain a polymer, particularly preferably polybutylene terephthalate, polyamides, polycarbonate, polyurethanes, polybutylene, polypropylene, polyethylene, polyethylene terephthalate, polyvinyl chloride, polystyrene, acrylonitrile butadiene styrene, ethylene vinyl acetate, ethylene vinyl alcohol, polyimides, polyesters, polyketones, polyether ether ketones, and/or polymethyl methacrylate, acrylester styrene acrylonitrile, as well as mixtures, block polymers, and copolymers thereof. The polymer can contain a fraction of glass fibers, glass beads, minerals, or other fillers, preferably a fraction from 9% to 11%. The housing can be designed in one or a plurality of parts.

In an advantageous embodiment of the connection element according to the invention, the housing has at least one strut between its bottom and the plug receptacle, preferably exactly one strut. Compared to a solid material, the strut has the advantage of a weight savings along with sufficiently high stability. Furthermore, the strut permits simple gripping of the housing by an automated positioning arm and simple, precise alignment on the substrate.

The adhesive fastening according to the invention advantageously contains a rigid or elastic adhesive, preferably an acrylic adhesive, a silicone adhesive, or a thermally hardenable adhesive. An alternative adhesive fastening advantageously contains construction-grade adhesive strips, preferably thermally hardenable adhesive films. Another alternative adhesive fastening includes adhesive strips with an elastic body, particularly preferably a body made of acrylic foam. The elastic body preferably has double-sided adhesive surfaces.

The electrical conductor according to the invention preferably contains copper, iron, aluminum, steel, in particular spring steel, and alloys thereof, particularly preferably a chromium nickel alloys, copper iron alloys, brass, or bronze. The electrical conductor according to the invention can be coated with another metal or a metal alloy. The electrical conductor according to the invention is preferably plated with silver, gold, tin, zinc, or nickel.

The electrically conducting structures on the substrate are typically very thin and are damaged by low mechanical forces, in particular shearing forces. In an advantageous embodiment of the invention, at least one region of the electrical conductor is elastically implemented, for example, by tapering or by looping. The electrical conductor is thus suited to absorb mechanical forces and, in particular, the force component in the plug-in direction of the plug and parallel to the substrate. Such forces occur during insertion of a plug into the plug receptacle. By means of an elastic embodiment of the electrical conductor, the effect of force on the contact points between the contact pad and the electrically conducting structures is relieved. Thus, damaging of the contact point or detachment of the electrically conducting structure from the substrate is avoided. Furthermore, the elastic regions can compensate for thermal expansion differences, for example, in the case of thermal expansion of a rigid substrate.

In an advantageous embodiment, the contact pads according to the invention are arranged in a line with the projection of the plug-in direction of the plug receptacle on the substrate. Preferably, the electrical conductors likewise run in the projection direction outside the housing. The contact pads are arranged, for example, offset relative to the projection direction in a row, next to each other, or parallel. This has the particular advantage that forces that occur at the time of insertion of the plug into the plug receptacle are compensated for by the elastic regions of the electrical conductors. Thus, shearing forces between the contact pad and the electrically conductive structure as well as between the electrically conducting structure and substrate are reduced.

The contact surface of the contact pads can be adapted in size and shape to the circumstances of the individual case and can vary widely. Preferably, the contact surface of a contact pad is from 1 mm×1 mm to 10 mm×10 mm and particularly preferably from 2 mm×2 mm to 5 mm×5 mm. The contact pads can, for example, have round, rectangular, or polygonal base surfaces.

In an advantageous embodiment of the invention, the contact pad is connected to the electrically conducting structure by at least one clamp connection.

The clamp connection is preferably formed by touching contact between the contact pad and the electrically conductive structure. For this purpose, the electrical conductor is shaped such that the contact pad, in a non-installed connection element, is arranged in a plane below the bottom of the housing. At the time of placement of the housing on the substrate, the contact pads are bent upward away from substrate with the electrical conductors and thus preloaded. The contact pads press downward onto the electrically conductive structures with a force created by the bending of the electrical conductors. The preloading is durably maintained by the adhesive fastening of the housing to the substrate. Thus, the contact pads and the electrically conductive structures are durably contacted electrically.

The clamp connection alternatively contains at least one rivet per contact pad. The clamp connection or rivet connection is particularly advantageous with substrates having a polymer film. The polymer film can be easily drilled through or punched through. A rivet can be particularly easily introduced into the substrate through the opening thus created. The rivet preferably contains a metal and, particularly preferably, copper.

In an alternative embodiment, the contact pad can be glued onto the electrically conducting structure with an electrically conductive adhesive.

In another alternative embodiment of the invention, the contact pad is connected by soldering compound to the electrically conductive structure. This type of connection is particularly advantageous with electrically conducting structures that are applied on a glass substrate or a ceramic substrate, since, in contrast to the rivet method, the substrate does not have to be pierced.

The contact pads advantageously have a distance of 0.5 mm to 30 mm between them. The contact pads and the electrically conducting structures can additionally be electrically insulated, for example, by an electrically insulating coating. The contact pads advantageously have, in the case of a soldered connection, a distance of at least 9 mm from each other, preferably of at least 14 mm, and particularly preferably of 14 mm to 30 mm. As experiments of the inventor demonstrated, electrical corrosion of the electrically conducting structures and the soldering compound occurs more frequently due to differences in stress and heating, for example, with heating structures and in the presence of electrolytically active media. Electrolytically active media include, for example, a mixture of contaminants in conjunction with condensation water, as is commonly formed on the interior side of motor vehicle glazing. A minimum distance between two adjacent contact pads of at least 9 mm is particularly advantageous since electrical corrosion is sufficiently avoided under the requirements of automotive engineering.

The plug receptacle according to the invention preferably has a flexible tongue with a bulge or recess. The plug receptacle can be locked in place therewith by a precisely mating recess or bulge on the plug. This has the particular advantage that the plug and the plug receptacle are fixedly connected to each other and protected against unintentional separation.

In an advantageous embodiment of a connection arrangement according to the invention, the substrate contains a polymer or polymer film. The polymer according to the invention preferably contains polyethylenenterephtalat (PETP), polyvinyl butyral (PVB), polyurethane (PU), polyvinyl chloride (PVC), polyimide (PI), polypropylene (PP), polyethylene (PE), polyphenylene sulfide (PPS), polyaryletherketone (PAEK), polyethyleneimine (PEI), polysulfone (PSU), polyethylene naphthalate (PEN), polybutylene terephthalate (PBT), polyethylene terephthalate (PET), polyamide (PA), polycarbonate (PC), cyclic olefin copolymers (COC), polyoxymethylene (POM), acrylonitrile butadiene styrene (ABS), mixtures or layered compounds thereof. Particularly suitable are flame-retardant treated polymers. The polymer film preferably has a thickness of 5 µm to 700 µm, preferably of 8 µm to 200 µm, and in particular of 20 µm to 150 µm. The polymer film can preferably contain a transparent polymer or a cutout in an inspection region, for example, a camera.

In the context of the invention, the characteristic "transparent" refers to optical transparency in the wavelength range from 200 nm to 2000 nm, preferably 400 nm to 1300 nm. With a transparent substrate, the transmission in the wavelength range from 400 nm to 1300 nm is preferably more than 70%.

The polymer film is preferably adhesively bonded to a pane or to another rigid or flexible carrier substrate. This is particularly advantageous when the polymer film is used as a heating film or antenna structure. The polymer film preferably contains an adhesive, particularly preferably acrylate adhesives, methyl methacrylate adhesives, cyanoacrylate adhesives, polyepoxides, silicone adhesives, and/or silane-curing polymer adhesives as well as mixtures thereof. The polymer film preferably contains a self-adhesive film.

In an alternative embodiment of the connection arrangement according to the invention, the substrate includes a pane, in particular a transparent pane. The pane preferably contains glass, ceramics, and/or polymers, preferably flat glass, float glass, quartz glass, borosilicate glass, soda lime glass, polymethyl methacrylate, polycarbonate, and/or mixtures thereof. The thickness of the pane is preferably from 0.5 mm to 20 mm and particularly preferably from 1.6 mm to 2.6 mm. The pane preferably comprises single plane security glass (ESG) or laminated security glass (VSG).

The substrate has at least two electrically conductive structures. The electrically conductive structures can be electrically connected to each other, preferably via an ohmic resistor, capacitively or inductively. The electrically conductive structures can, for example, be the two ends of a heating wire or an alarm loop. For better contacting, the electrically conductive structures can be widened, thickened, or coated with other materials, for example, with corrosion protection, in the region of the connection to the contact pad. This has the particular advantage that the electrical connection is particularly durable, stable, and corrosion resistant.

The electrically conductive structure advantageously contains wires or layers of a metal, a metal compound, a metal alloy, or an electrically conductive polymer. In a preferred embodiment, the electrically conductive structure is made from a metal or a metal alloy. Particularly suitable metals are copper, aluminum, silver, tin, gold, iron, tungsten, chromium, or nickel. Particularly suitable metal compounds are metal oxides and metal sulfides, such as titanium oxide ($TiO_2$), chromium oxide, zinc sulfide, fluorine-doped tin oxide ($F:SnO_2$), and tin-doped indium oxide (ITO). Particularly suitable metal alloys are alloys of copper-aluminum and copper-zinc. Suitable electrically conductive polymers are polyaniline or polyethylenedioxythiophene. The metals, metal compounds, and metal alloys can be applied using the conventional techniques such as chemical vapor deposition (CVD) or physical vapor deposition (PVD), such as cathode sputtering. The electrically conductive structures can be applied on the entire surface and then partially removed, for example, using photolithography. Alternatively, the electrically conductive structures can be printed on or mounted from films. The thickness of the electrically conductive structure is, for example, 0.001 μm to 200 μm and preferably 0.1 μm to 50 μm.

The electrically conductive structure according to the invention preferably contains silver, particularly preferably silver particles and glass frits. The silver particles and glass frits are printed on and then fired. Such an electrically conductive structure preferably has a layer thickness of 8 μm to 15 μm, particularly preferably of 10 μm to 12 μm.

The electrically conductive structure can have, partially and outside the contact point with the contact pad, a cover layer, preferably a film made from one or a plurality of electrically insulating polymers or an electrically insulating coating. The cover layer preferably contains PVB, EVA, PET, and/or mixtures thereof. The cover layer is preferably arranged protruding such that the polymer film and the electrically conducting structure can be laminated onto a surface of a pane using the cover layer.

The contact pad preferably has a recess or bulge to accommodate soldering compound. The recess can also be an opening or a hole. Before the soldering process, soldering compound and flux can be arranged in the recess. This enables simple soldering to the electrically conductive structure, from the process engineering standpoint, since no soldering compound has to be additionally supplied. A depot of soldering compound can be arranged on the contact pad already during production of the connection element.

The soldering compound according to the invention preferably contains tin, bismuth, indium, zinc, copper, silver, lead, or compositions thereof. The fraction of tin in the solder composition according to the invention is preferably from 3 wt.-% to 99.5 wt.-%, particularly preferably from 10 wt.-% to 95.5 wt.-%, quite particularly preferably from 15 wt.-% to 60 wt.-%. The fraction of bismuth, indium, zinc, copper, silver, or compositions thereof is preferably from 0.5 wt.-% to 97 wt.-%, and particularly preferably 10 wt.-% to 67 wt.-%; the fraction of tin, bismuth, indium, zinc, copper, or silver can be 0 wt.-%. The solder composition according to the invention can contain nickel, germanium, aluminum, or phosphorus in a fraction from 0 wt.-% to 5 wt.-%. The solder composition according to the invention contains quite particularly preferably Bi57Sn42Ag1, Bi59Sn40Ag1, In97Ag3, Sn95,5Ag3.8Cu0.7, Bi67In33, Bi33In50Sn17, Sn77.2In20Ag2.8, Sn95Ag4Cu1, Sn99Cu1, Sn96.5Ag3.5, or mixtures thereof. The soldering compound according to the invention is preferably leadfree and contains no lead or only production-related admixtures of lead. The layer thickness of the solder according to the invention is preferably $<7.0\times10^{-4}$ m, particularly preferably $<3.0\times10^{-4}$ m, and in particular $<0.5\times10^{-4}$ m.

In an advantageous embodiment, the contact surface of a contact pad according to the invention has spacers. The contact surface of the contact pad is the bottom of the contact pad turned toward the substrate. The electrical line connection to the electrically conductive structure on the substrate takes place via the contact surface. The spacers result in the formation of a defined and uniform solder thickness during the soldering process and preferably have a height of $0.1\times10^{-4}$ m to $7\times10^{-4}$ m.

In an advantageous embodiment of the invention, the plug receptacle and the plug are designed such that they only engage in each other in one assembly direction. This enables simple assembly with no risk of polarity reversal.

The plug contacts according to the invention can be pins, tongues, or sleeves, with the plug according to the invention having the mating part. The plug contact, the electrical conductor, and the contact pad are preferably designed as regions of a single-piece component.

Another aspect of the invention comprises a method for producing a connection arrangement according to the invention or for assembling a connection element according to the invention, wherein at least:
a) the housing and the substrate are bonded by the adhesive fastening,
b) at least two contact pads are electrically conductively connected to the electrically conductive structures on the substrate, and
c) a plug is inserted into the plug receptacle.

In an advantageous embodiment of the method according to the invention, the contact pads are bonded to the electrically conducting structure on the substrate by soldering, welding, gluing, or clamping, preferably by rivets.

The soldering is done preferably by punch soldering, thermode soldering, piston soldering, particularly preferably laser soldering, hot air soldering, induction soldering, resistance soldering, and/or using ultrasound.

The invention further comprises the use of a connection element according to the invention for electrical contacting of electrically conductive structures, and, in particular, of heating conductors, alarm loops, sensors, and antennas, on polymer films and/or panes, in particular in or on means of transportation for travel on land, in the air, or on water, in particular, in motor vehicles, for example, as a windshield, rear window, side window, and/or glass roof.

It is understood that the various embodiments can be realized individually or in any combinations. In particular, the characteristics mentioned above and to be explained in the following are usable not only in the combinations indicated but also in other combinations or alone, without departing from the scope of the present invention.

The invention is explained in detail in the following with reference to drawings. The drawings are schematic representations and are not true to scale. The drawings in no way restrict the invention.

Figure 2:
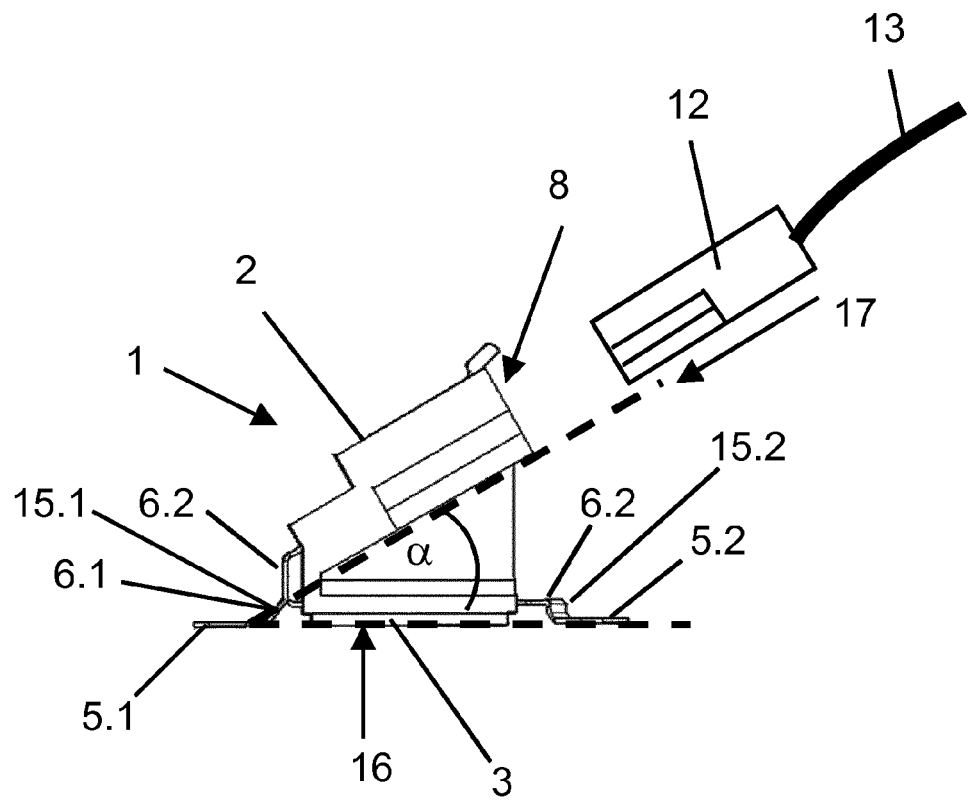
Figure 3:
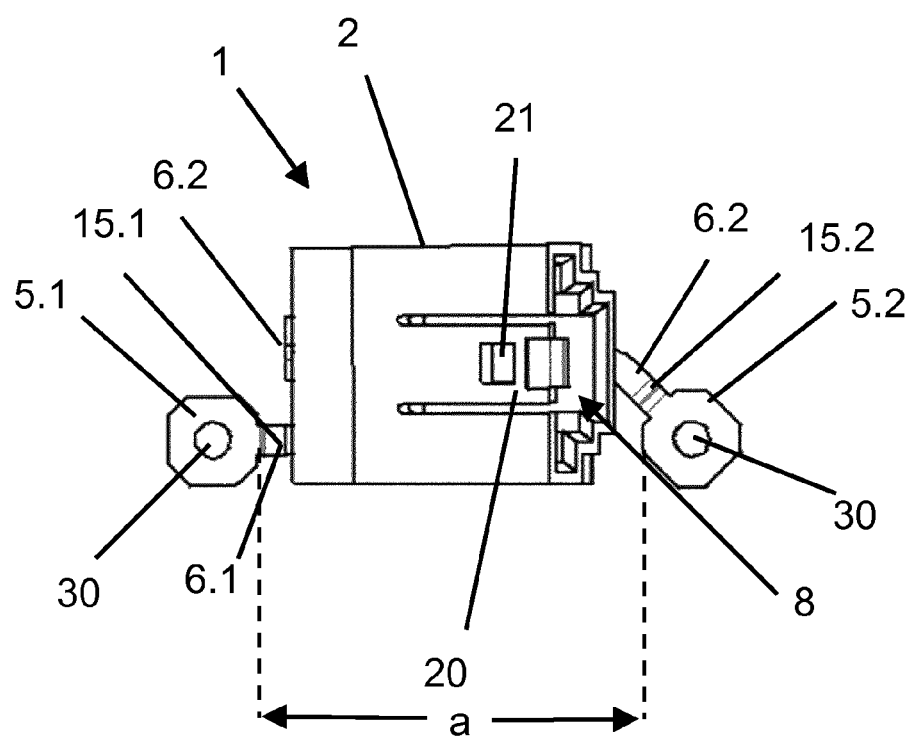
Figure 4:
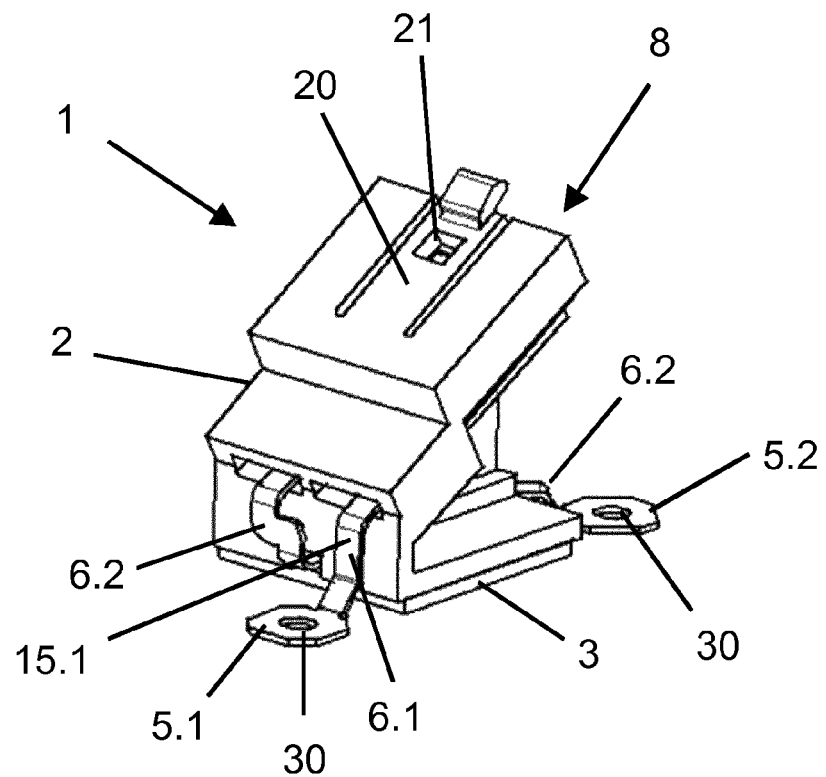
Figure 5:
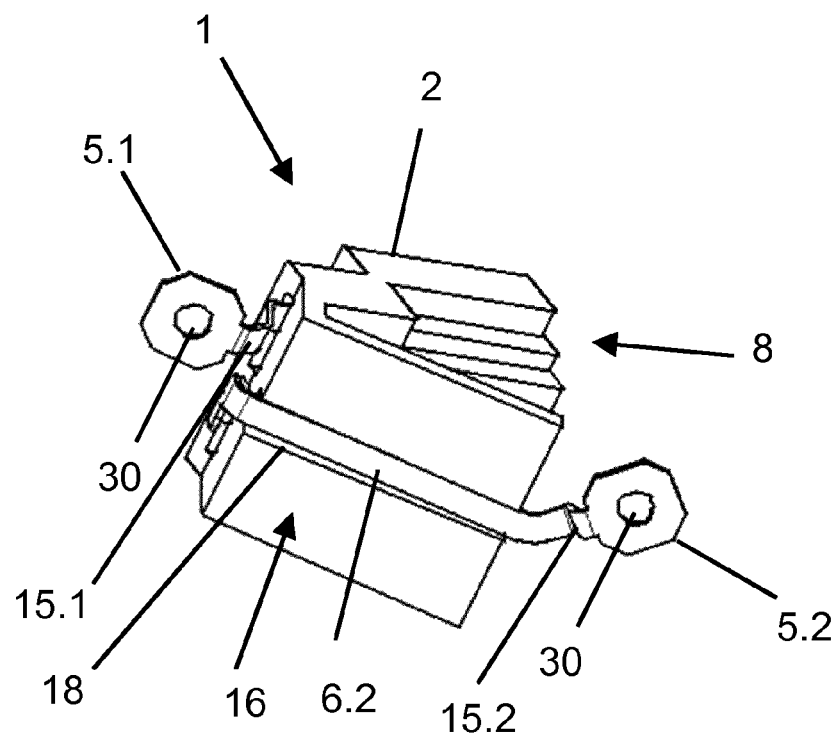
Figure 6:
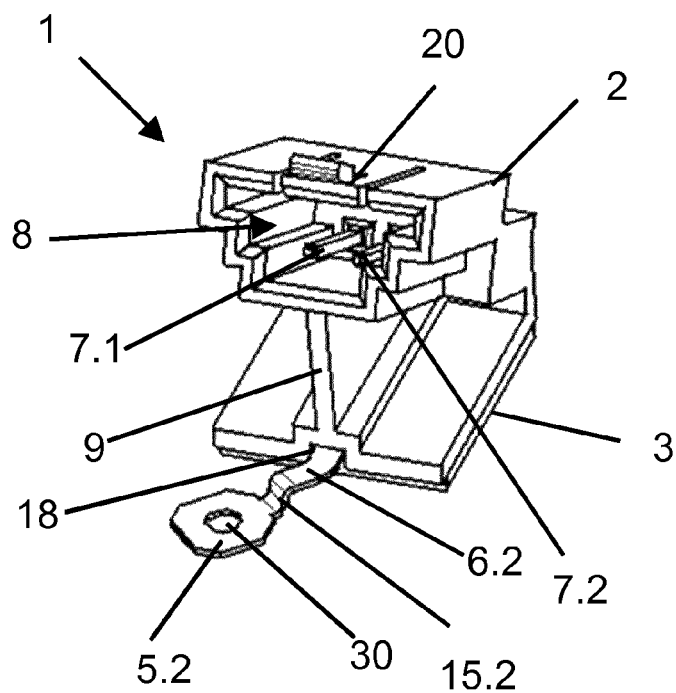
Figure 7:
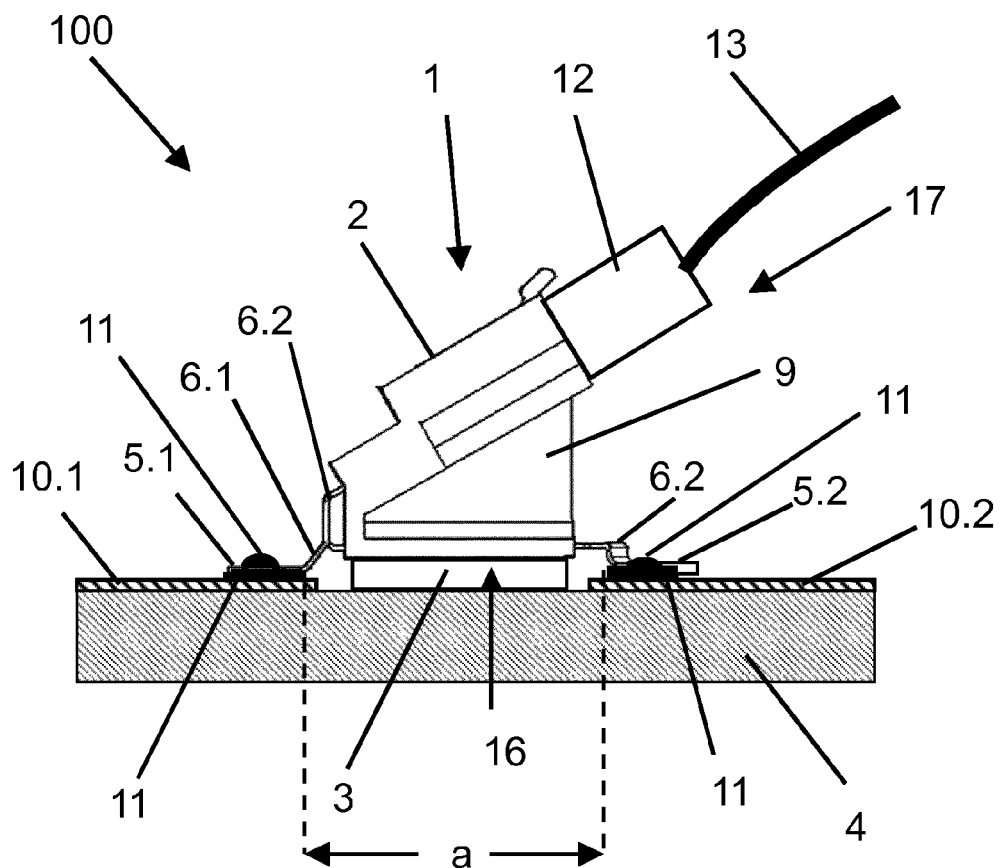
Figure 8:
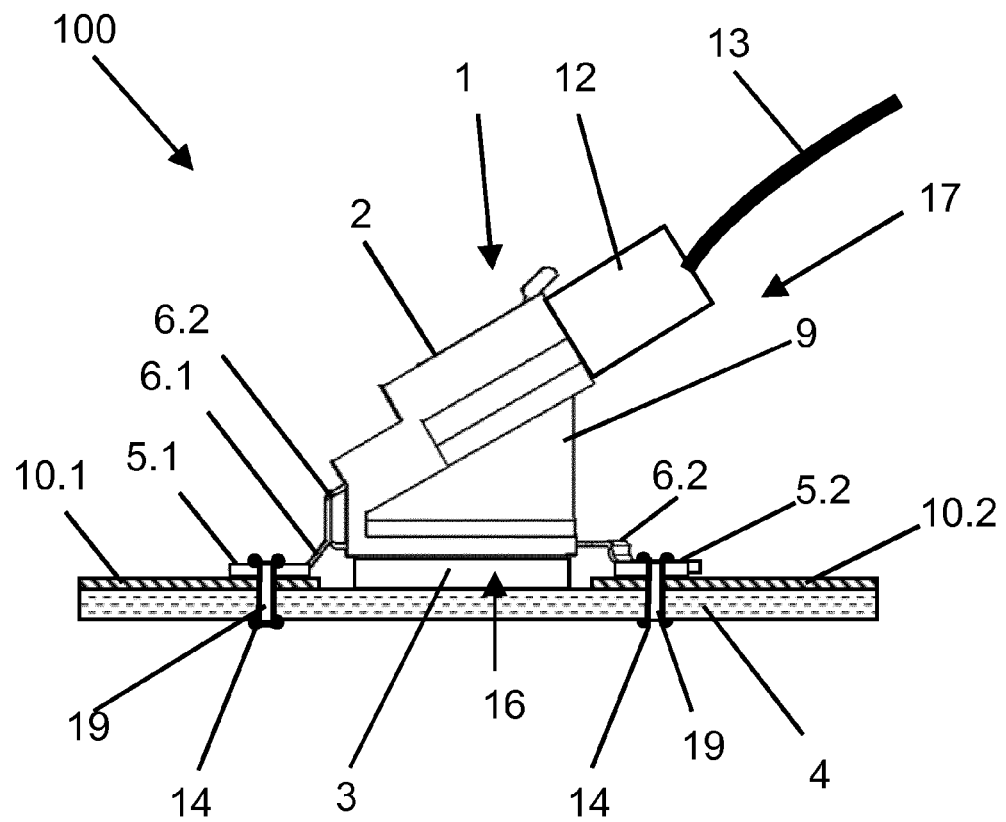
Figure 9:
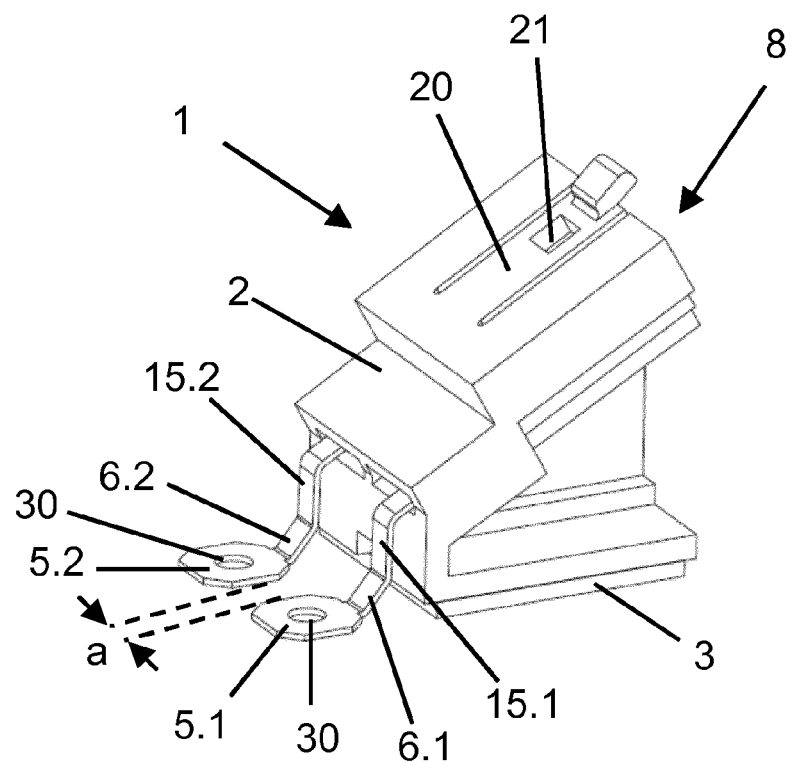
Figure 10:
Figure 10:
Figure 11:
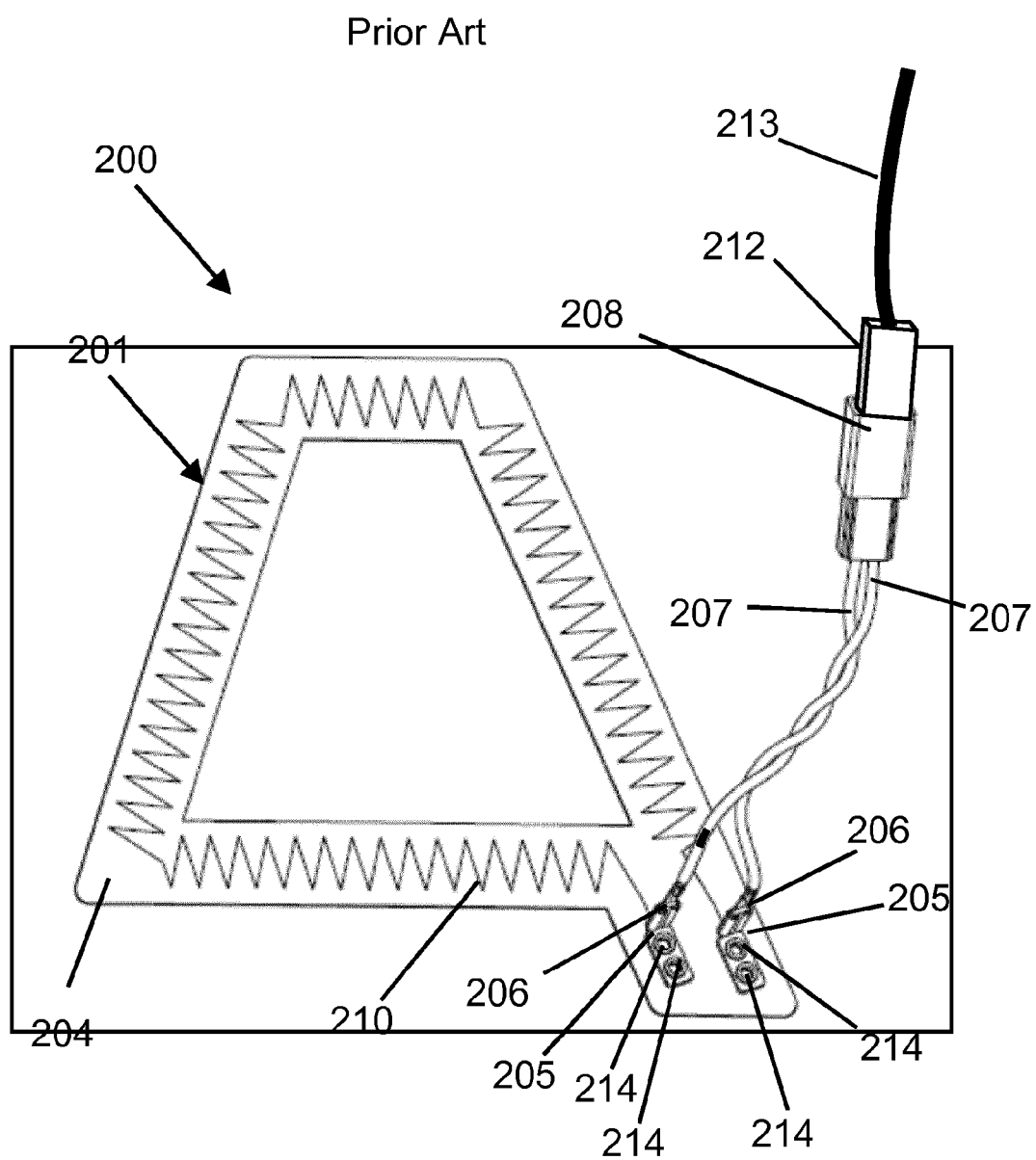

They depict:

FIG. 1 a perspective view of a connection arrangement implemented according to the invention, FIG. 2 a side view of a connection element implemented according to the invention, FIG. 3 a schematic representation of the connection element implemented according to the invention in a view from above, FIG. 4 a perspective view of a connection element implemented according to the invention, FIG. 5 another perspective view of a connection element implemented according to the invention in a bottom view, FIG. 6 another perspective view of a connection element implemented according to the invention in a front view, FIG. 7 a side view of a connection arrangement implemented according to the invention, FIG. 8 a side view representation of an alternative connection arrangement implemented according the invention, FIG. 9 a perspective view of an alternative connection element implemented according to the invention, FIG. 10 a flowchart of an exemplary embodiment of the method according to the invention, and FIG. 11 a schematic representation of a connection arrangement according to the prior art.

FIG. 1 is a schematic view of a connection arrangement implemented according to the invention identified with the reference character 100. The connection element 1 according to the invention comprises a housing 2 that is bonded to a substrate 4 by an adhesive fastening 3.

The substrate 4 is, in this example, a transparent pane made of 3-mm-thick, thermally prestressed single pane security glass made of soda lime glass. The substrate 4 has a width of 150 cm and a height of 80 cm, with only a detail depicted in FIG. 1. An electrically conducting structure 10.1, 10.2 in the form of a heating conductor loop is printed on the substrate. Only the ends and connection points of the electrically conductive structure 10.1, 10.2 are depicted. The electrically conducting structure 10.1, 10.2 contains silver particles and glass frits that were printed on and fired.

The housing has, for example, a base surface of 12 mm×12 mm and a height of 15 mm. The housing contains, for example, polybutylene terephthalate with a 10% fraction of glass fibers (PBT-GF10) and was produced by an injection molding method.

The adhesive fastening 3 contains, for example, a double-sided adhesive strip with a two-sided adhesive acrylic foam. The acrylic foam is adhered sheet-wise on one side to the bottom 16 of the housing 2 and sheet-wise on the opposite side to the substrate 4.

The housing 2 contains two electrical conductors 6.1, 6.2, which, in each case, end in the form of a plug contact 7.1, 7.2 in the interior of the plug receptacle 8. The electrical conductors 6.1, 6.2 are guided out of the housing 2 and end in contact pads 5.1, 5.2. The contact pads 5.1, 5.2 are electrically conductively connected to the electrically conducting structures 10.1, 10.2 on the substrate 4 and, for example, soldered.

FIG. 2 depicts a side view of the connection element 1. The plug-in direction 17 is the direction in which the plug 12 is inserted into the plug receptacle 8. The plug receptacle 8 is arranged such that the angle α between the plug-in direction 17 of the plug receptacle 8 and the bottom 16 of the housing 2 is roughly 45°. The plug 12 has two electrical conductors in the interior, which are, in each case, connected to plug contacts 7.1, 7.2. The electrical connection to the onboard power supply is made, for example, via a two-wire supply line 13.

FIGS. 3 to 6 depict perspective views of an exemplary embodiment of the connection element 1 according to the invention.

FIG. 3 depicts a view of the connection element 1 from above and FIG. 4 a view of the exit side of the electrical conductors 6.1, 6.2 of the housing 2. The contact pads 5.1, 5.2 are arranged on the substrate 4 in a line with the projection of the plug-in direction 17 of the plug receptacle 8. This has the particular advantage that the forces occurring at the time of the insertion of the plug 12 into the plug receptacle 8 are largely deflected to the substrate 4. Thus, the contact point between the contact pad 5.1, 5.2 and the electrically conducting structure 10.1, 10.2 is relieved, as is the connection between the electrically conducting structure 10.1, 10.2 and the substrate 4.

The housing 2 includes a flexible tongue 20 with a recess 21. The flexible tongue 20 is formed by two parallel incisions into the polymer of the housing 2 in the region of the plug receptacle 8. The region remaining between the incisions is elastic due to the elastic polymer material of the housing 2 and fulfills the function of a flexible tongue 20. The flexible tongue 20 has, for example, a recess 21, which results, along with a mating bump in the plug 12, in a locking of the inserted plug 12.

FIG. 5 depicts a view of the bottom 16 of the housing 2. For improved clarity, the adhesive fastening 3 is not shown in FIG. 5. In the exemplary embodiment depicted, the contact pads 5.1, 5.2 are arranged on different sides of the housing 2. For this, the electrical conductor 6.2 is arranged in a channel-like recess 18 on the bottom 16 of the housing 2 and leads from the exit side out of the housing 2 to the opposite side. This has the particular advantage that with a compact structure of the connection element 1, the distance a between the contact pads 5.1 and 5.2 is as large as possible. The minimum distance a between the two contact pads 5.1, 5.2 is, for example, 15 mm. This minimum distance is advantageous to avoid electrical corrosion of the electrically conductive structure 10.1, 10.2 and of the solder point between the pad 5.1, 5.2 and the electrically conducting structure 10.1, 10.2.

FIG. 6 depicts a view of the plug receptacle 8 of the connection element 1 according to the invention. Inside the plug receptacle 8, for example, two rod-shaped plug contacts 7.1, 7.2 are arranged near each other. The plug receptacle can, alternatively, have tongues or sleeves or be shaped differently. The plug contacts 7.1, 7.2 can protrude from the plug receptacle 8. The plug receptacle 8 can consist only of plug contacts 7.1, 7.2 and have no guidance from parts of the housing.

The plug receptacle 8 has a multistage shape which permits, with a mating design of a plug 12, a geometrically unique assembly with no risk of pole reversal.

FIG. 7 depicts a side view of a connection arrangement 100 designed according to the invention. The substrate comprises, for example, a transparent pane made of glass, as has already been described with reference to FIG. 1.

The contact pads 5.1, 5.2 are connected via soldering compound 11 to the electrically conducting structures 10.1, 10.2 on the substrate 4. The contact pads 5.1, 5.2 were soldered at a temperature of 200° C. and a treatment duration of 2 seconds onto the electrically conducting structure 10.1, 10.2. The soldering compound 11 had already been arranged in recesses 30 of the contact pads 5.1, 5.2 before the soldering process and, in particular, during the production of the connection element 1. Part of the soldering compound 11 passed through the recess 30 onto the top during the soldering process. This enables visual control of the soldering process and the quality of the solder point on the bottom of the contact pad 5.1, 5.2. Here, "top" means the side of the contact pad 5.1, 5.2 turned away from the substrate 4. "Bottom" of the contact pad 5.1, 5.2 means the side turned toward the substrate 4 and the electrically conducting structure 10.1, 10.2.

FIG. 8 depicts a side view of an alternative connection arrangement 100 implemented according to the invention. The substrate 4 includes, in this example, a 300-μm-thick polymer film, which contains, for example, one or a plurality of layers of polyester. An electrically conducting structure 10.1, 10.2 is arranged on the polymer film. The electrically conducting structure 10.1, 10.2 includes, for example, a 15-μm-thick brass layer and is implemented in the form of loop-shaped heating conductor.

The contact pads 5.1, 5.2 are connected by a clamp connection 14 and, for example, by a rivet to the electrically conducting structure 10.1, 10.2. For this, the substrate 4 has, in the region of the electrically conducting structures 10.1, 10.2, in each case, a through-hole 19. Furthermore, each contact pad 5.1, 5.2 has a recess 30. The through-hole 19 in the substrate 4 and the recess 30 in the contact pad 5.1, 5.2 are arranged one above the other. The rivet 14 reaches through the through-hole 19 in the substrate 4 and the recess 30 in the contact pad 5.1, 5.2 and presses the contact pad 5.1, 5.2 and the electrically conducting structure 10.1, 10.2 together durably and electrically conductively.

FIG. 9 depicts a perspective view of an alternative connection element 1 implemented according to the invention. In contrast to the exemplary embodiments of FIG. 1 through 8, the contact pads 5.1, 5.2 are arranged on the same side of the housing 2 and, for example, on the exit side of the electrical conductors 6.1, 6.2 from the housing 2. This has the advantage of a particularly compact structure of the connection element 1. The contact pads 5.1, 5.2 are preferably preferably riveted to a substrate. Here, the distance a between the contact pads 5.1 and 5.2 is, for example, 2 mm. This distance is advantageous for adequate electrical insulation and practical handling under the stresses and use conditions of automotive engineering.

FIG. 10 depicts a flowchart of an exemplary embodiment of the method according to the invention.

FIG. 11 is a schematic representation of a connection arrangement 200 according to the prior art for the electrical contacting of a heating film 201. The substrate is a polymer film 204, on which an electrically conductive structure 210 is arranged as a heating conductor loop. An upward angled metal bracket 205 is, in each case, arranged on the ends of the electrically conductive structure 210. The metal bracket 205 is connected to the polymer film 204 by two rivets 214 in each case. The region of the metal bracket 205 arranged orthogonally to the polymer film 204 serves as a flat plug connector. The flat plug connector is connected to an automotive flat plug socket 206. The flat plug socket 206 is electrically conductively connected to a cable 207, for example, crimped. Two cables 207 end in a plug coupling 208. The plug coupling 208 is connected to a plug 212 and a two-wire supply line 213.

The assembly of the connection arrangement 200 according to the prior art takes place in multiple steps: First, the metal brackets 205 are riveted onto the polymer film 204. In another step, the two flat plug sockets 206 are connected to the metal brackets 205. The two flat plug sockets 206 are components of a preassembled adapter cable with two cables 207 and a plug coupling 208. In another step, the plug coupling 208 is connected to a plug 212. The plug coupling 208 and the cable 207 are fastened in another step on a plastic mounting support (not shown), for example, the mounting support of a camera or a rain sensor. This is necessary in order to avoid tensile loading via the cable 207 on the metal bracket 205 and the polymer film 204. Due to the plug element fastened on slack cables, the plug connections must be guided and plugged with two hands. Because of the smallness of the parts, the tasks can be executed only with difficulty with protective gloves, as would be desirable from a safety standpoint.

The present invention has multiple advantages compared to the connection arrangements according to the prior art 200. The electrically conducting structures 10.1, 10.2 and the contact points with the contact pad 5.1, 5.2 are easily damaged by impinging mechanical forces and, in particular, shearing forces. According to the invention, the housing 2 of the connection element 1 is bonded by an adhesive fastening 3 to the substrate 4. The adhesive fastening 3 can be elastic and absorb forces acting on the housing 2. Alternatively, the adhesive fastening 3 can be implemented rigid and transfer forces to the substrate 4. Both options relieve the electrical line connection between the contact pad 5.1, 5.2 and the electrically conductive structure 10.1, 10.2, which results in a lower failure rate of the connection arrangement 100 during production and use.

The connection arrangement 100 according to the invention has other advantages from a processing technology standpoint. Fewer process steps are necessary than with connection arrangements according to the prior art 200. The insertion of the plug 12 at the assembly site can be done one-handed and with gloves. This shortens the assembly time and increases work safety for the assembler.

The housing 2 and the contact pads 5.1, 5.2 situated thereon are securely bonded to the substrate 4 by the adhesive fastening 3 without the possibility of sliding. The subsequent connection between the contact pad 5.1, 5.2 and the electrically conductive structure 10.1, 10.2 can be performed precisely and without further adjustment. This simplifies the production process and increases production throughput.

These and other advantages were unexpected and surprising for the person skilled in the art.

REFERENCE CHARACTERS 1 connection element
2 housing
3 adhesive fastening
4 substrate
5.1, 5.2 contact pad
6.1, 6.2 electrical conductor
7.1, 7.2 plug contact
8 plug receptacle 9 strut
10.1, 10.2 electrically conductive structure
11 soldering compound
12 plug
13 supply line
14 clamp connection, rivet
15.1, 15.2 elastic region
16 bottom of the housing 2
17 plug-in direction of the plug receptacle 8
18 recess on the bottom 16 of the housing 2
19 through-hole in the substrate 4
20 flexible tongue
21 recess in the flexible tongue 21
30 recess in the contact pad 5.1, 5.2
100 connection arrangement
200 connection arrangement according to the prior art
201 heating film
204 polymer film
205 metal bracket
206 automotive flat plug socket
207 cable
208 plug coupling
210 electrically conductive structure
212 plug
213 supply line
214 rivet
a distance
α angle

The invention claimed is:

1. A connection arrangement, comprising:
a substrate having at least two electrically conductive structures,
a housing, which is bonded on its bottom to the substrate by an adhesive fastening,
the housing has a plug receptacle having at least two plug contacts,
the plug contacts are connected via electrical conductors to at least two contact pads, and
the contact pads are electrically conductively connected to the electrically conductive structures,
wherein the contact pads are arranged on different sides of the housing,
wherein the contact pads are arranged in a line with a projection of a plug-in direction of the plug receptacle on the substrate,
wherein an angle between the plug-in direction of the plug receptacle and the bottom of the housing is from 15° to 90°,
wherein the electrically conductive structures contain a vapor deposited, printed-on, or glued-on metal, a metal compound, a metal alloy, or an electrically conductive polymer, and
wherein the contact pads are connected with the electrically conductive structures by a soldering compound, an electrically conductive adhesive, or a clamp connection.

2. The connection arrangement according to claim 1, wherein the angle is from 30° to 70° and preferably from 35° to 55°.

3. The connection arrangement according to claim 1, wherein the substrate contains a polymer, preferably a polymer film with a thickness from 5 μm to 700 μm and preferably polyethylenenterephtalat (PETP), polyvinyl butyral (PVB), polyurethane (PU), polyvinyl chloride (PVC), polyimide (PI), polypropylene (PP), polyethylene (PE), polyphenylene sulfide (PPS), polyaryletherketone (PAEK), polyethyleneimine (PEI), polysulfone (PSU), polyethylene naphthalate (PEN), polybutylene terephthalate (PBT), polyethylene terephthalate (PET), polyamide (PA), polycarbonate (PC), cyclic olefin copolymers (COCs), polyoxymethylene (POM), acrylonitrile butadiene styrene (ABS), mixtures or layered compounds thereof.

4. The connection arrangement according to claim 1, wherein the substrate contains glass and/or ceramic, preferably a transparent pane with a thickness from 0.5 mm to 20 mm and preferably flat glass, float glass, quartz glass, borosilicate glass, soda lime glass, and/or mixtures thereof.

5. The connection arrangement according to claim 1, wherein the contact pad is connected with the electrically conductive structure by a preloaded touching contact or a rivet.

6. The connection arrangement according to claim 1, wherein the contact pads have a distance between them of at least 9 mm, preferably of at least 14 mm, and particularly preferably of 14 mm to 30 mm.

7. A method, comprising:
using the connection arrangement according to claim 1, for contacting heating conductors, alarm loops, and antennas on polymer films and/or panes, preferably in means of transportation for travel on land, in the air, or on water, in particular in motor vehicles, for example, on windshields, rear windows, side windows, and/or glass roofs.

8. A connection element, comprising:
a housing that has an adhesive fastening on its bottom for bonding to a substrate,
the housing has a plug receptacle having at least two plug contacts, and
the plug contacts are connected via electrical conductors to at least two contact pads,
wherein the contact pads are arranged on different sides of the housing,
wherein the contact pads are arranged in a line with a projection of a plug-in direction of the plug receptacle on the substrate,
wherein the contact pads are suitable for the electrical contacting of electrically conductive structures on the substrate, and
wherein the electrically conductive structures contain a vapor deposited, printed-on, or glued-on metal, a metal compound, a metal alloy, or an electrically conductive polymer and an angle between the plug-in direction of the plug receptacle and the bottom of the housing is from 15° to 90°.

9. The connection element according to claim 8, wherein the housing has a strut between its bottom and the plug receptacle.

10. The connection element according to claim 8, wherein the electrical conductor is elastic in at least one region and mechanical forces are absorbable in the plug-in direction and parallel to the substrate.

11. The connection element according to claim 8, wherein the contact pad has at least one recess to accommodate soldering compound or a clamp connection.

12. A method for producing the connection arrangement according to claim 1, wherein at least:
the housing and the substrate are bonded by the adhesive fastening,
at least two contact pads are electrically conductively connected to the electrically conductive structures on the substrate, and
a plug is plugged into the plug receptacle.

13. The method according to claim 12, wherein the contact pad and the electrically conductive structure are connected by soldering, welding, gluing, or clamping, preferably by a preloaded touching contact or by rivets.

14. A method for assembling the connection element according to claim 8, wherein at least:
- the housing and the substrate are bonded by the adhesive fastening,
- at least two contact pads are electrically conductively connected to the electrically conductive structures on the substrate, and
- a plug is plugged into the plug receptacle.

15. A method, comprising:
- using the connection element according to claim 8, for contacting heating conductors, alarm loops, and antennas on polymer films and/or panes, preferably in means of transportation for travel on land, in the air, or on water, in particular in motor vehicles, for example, on windshields, rear windows, side windows, and/or glass roofs.

* * * * *